United States Patent
Bai et al.

(10) Patent No.: US 12,342,362 B2
(45) Date of Patent: *Jun. 24, 2025

(54) APPLICATION TIME FOR NON-SERVING CELL REFERENCE SIGNAL UPDATE

(71) Applicant: QUALCOMM Incorporated, San Diego, CA (US)

(72) Inventors: Tianyang Bai, Mountain View, CA (US); Yan Zhou, San Diego, CA (US); Junyi Li, Greentown, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,336

(22) Filed: Apr. 30, 2024

(65) Prior Publication Data

US 2024/0284498 A1     Aug. 22, 2024

Related U.S. Application Data

(63) Continuation of application No. 17/205,730, filed on Mar. 18, 2021, now Pat. No. 12,004,206.

(51) Int. Cl.
*H04W 72/12* (2023.01)
*H04L 5/00* (2006.01)
(Continued)

(52) U.S. Cl.
CPC ......... *H04W 72/535* (2023.01); *H04L 5/0048* (2013.01); *H04W 8/24* (2013.01);
(Continued)

(58) Field of Classification Search
CPC ............. H04W 72/0493; H04W 24/10; H04W 72/0446; H04L 5/0048; H04L 5/0053; H04L 5/0023; H04B 7/0695; H04B 17/309

See application file for complete search history.

(56) References Cited

U.S. PATENT DOCUMENTS 11,343,735 B2 *  5/2022  Cirik .................. H04B 7/06964
11,811,481 B2  11/2023  Chen et al.
(Continued)

FOREIGN PATENT DOCUMENTS

WO     2022084955 A1     4/2022

OTHER PUBLICATIONS

3GPP TSG RAN WG1 #104-e R1-2100588 Media tek Inc, enhancement on multi beam direction (Year: 2021).*
(Continued)

*Primary Examiner* — Romani Ohri
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive, from a base station, an indication of an update associated with a non-serving cell reference signal. The UE may select a first application time duration based at least in part on a determination that the non-serving cell reference signal has been tracked by the UE or a second application time duration based at least in part on a determination that the non-serving cell reference signal has not been tracked by the UE, resulting in a selected application time duration. The UE may apply the update associated with the non-serving cell reference signal after the selected application time duration. Numerous other aspects are described.

20 Claims, 7 Drawing Sheets

(51) Int. Cl.
   *H04W 8/24* (2009.01)
   *H04W 52/24* (2009.01)
   *H04W 72/0446* (2023.01)
   *H04W 72/1273* (2023.01)
   *H04W 72/50* (2023.01)

(52) U.S. Cl.
   CPC ..... *H04W 52/242* (2013.01); *H04W 72/0446* (2013.01); *H04W 72/1273* (2013.01)

(56) References Cited

U.S. PATENT DOCUMENTS

| | | | |
|---|---|---|---|
| 2021/0337547 A1 | 10/2021 | Rahman et al. | |
| 2022/0304006 A1 | 9/2022 | Bai et al. | |
| 2022/0330221 A1* | 10/2022 | Pan | H04L 5/0094 |
| 2023/0047929 A1 | 2/2023 | Matsumura et al. | |
| 2023/0074423 A1* | 3/2023 | Matsumura | H04L 5/006 |

OTHER PUBLICATIONS

Intel Corporation: "Enhancements to Multi-Beam Operation", 3GPP TSG RAN WG1 #104-e, R1-2100636, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971106.
International Preliminary Report On Patentability—PCT/US2022/070648—The International Bureau of WIPO—Geneva, Switzerland—Sep. 28, 2023.
International Search Report and Written Opinion—PCT/US2022/070648—ISA/EPO—Jun. 1, 2022.
Mediatek Inc: "Enhancement on Multi-Beam Operation", 3GPP TSG RAN WG1 #104-e, R1-2100588, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051971059, 27 Pages, Section 2.4.2, Figure 8.
Vivo: "Further Discussion on Multi Beam Enhancement", 3GPP TSG RAN WG1 #104-e, R1-2100421, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 29 Pages, XP051971010.

\* cited by examiner

APPLICATION TIME FOR NON-SERVING CELL REFERENCE SIGNAL UPDATE

RELATED APPLICATION

This application is a continuation of U.S. patent application Ser. No. 17/205,730, entitled "APPLICATION TIME FOR NON-SERVING CELL REFERENCE SIGNAL UPDATE," filed Mar. 18, 2021, which is incorporated herein by reference in its entirety.

FIELD OF THE DISCLOSURE

Aspects of the present disclosure generally relate to wireless communication and to techniques and apparatuses for application time selection for a non-serving cell reference signal update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an indication of an update associated with a non-serving cell reference signal; selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and applying the update associated with the non-serving cell reference signal after the selected application time duration.

In some aspects, a method of wireless communication performed by a base station includes transmitting, to a UE, an indication of an update associated with a non-serving cell reference signal; selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and applying the update associated with the non-serving cell reference signal after the selected application time duration.

In some aspects, a UE for wireless communication includes memory; one or more processors coupled to the memory; and instructions stored in the memory and operable, when executed by the one or more processors, to cause the UE to: receive, from a base station, an indication of an update associated with a non-serving cell reference signal; select a first application time duration based at least in part on a determination that the non-serving cell reference signal has been tracked by the UE or a second application time duration based at least in part on a determination that the non-serving cell reference signal has not been tracked by the UE, resulting in a selected application time duration; and apply the update associated with the non-serving cell reference signal after the selected application time duration.

In some aspects, a base station for wireless communication includes memory; one or more processors coupled to the memory; and instructions stored in the memory and operable, when executed by the one or more processors, to cause the base station to: transmit, to a UE, an indication of an update associated with a non-serving cell reference signal; select a first application time duration based at least in part on a determination that the non-serving cell reference signal has been tracked by the UE or a second application time duration based at least in part on a determination that the non-serving cell reference signal has not been tracked by the UE, resulting in a selected application time duration; and apply the update associated with the non-serving cell reference signal after the selected application time duration.

In some aspects, a non-transitory computer-readable medium stores one or more instructions for wireless communication that, when executed by one or more processors of a UE, cause the UE to: receive, from a base station, an indication of an update associated with a non-serving cell reference signal; select a first application time duration based at least in part on a determination that the non-serving cell reference signal has been tracked by the UE or a second application time duration based at least in part on a determination that the non-serving cell reference signal has not been tracked by the UE, resulting in a selected application time duration; and apply the update associated with the non-serving cell reference signal after the selected application time duration.

In some aspects, a non-transitory computer-readable medium stores one or more instructions for wireless communication that, when executed by one or more processors of a base station, cause the base station to: transmit, to a UE, an indication of an update associated with a non-serving cell reference signal; select a first application time duration based at least in part on a determination that the non-serving cell reference signal has been tracked by the UE or a second application time duration based at least in part on a determination that the non-serving cell reference signal has not been tracked by the UE, resulting in a selected application time duration; and apply the update associated with the non-serving cell reference signal after the selected application time duration.

In some aspects, an apparatus for wireless communication includes means for receiving, from a base station, an indication of an update associated with a non-serving cell reference signal; means for selecting a first application time duration based at least in part on a determination that the non-serving cell reference signal has been tracked or a second application time duration based at least in part on a determination that the non-serving cell reference signal has not been tracked, resulting in a selected application time duration; and means for applying the update associated with the non-serving cell reference signal after the selected application time duration.

In some aspects, an apparatus for wireless communication includes means for transmitting, to a UE, an indication of an update associated with a non-serving cell reference signal; means for selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and means for applying the update associated with the non-serving cell reference signal after the selected application time duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF)-chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
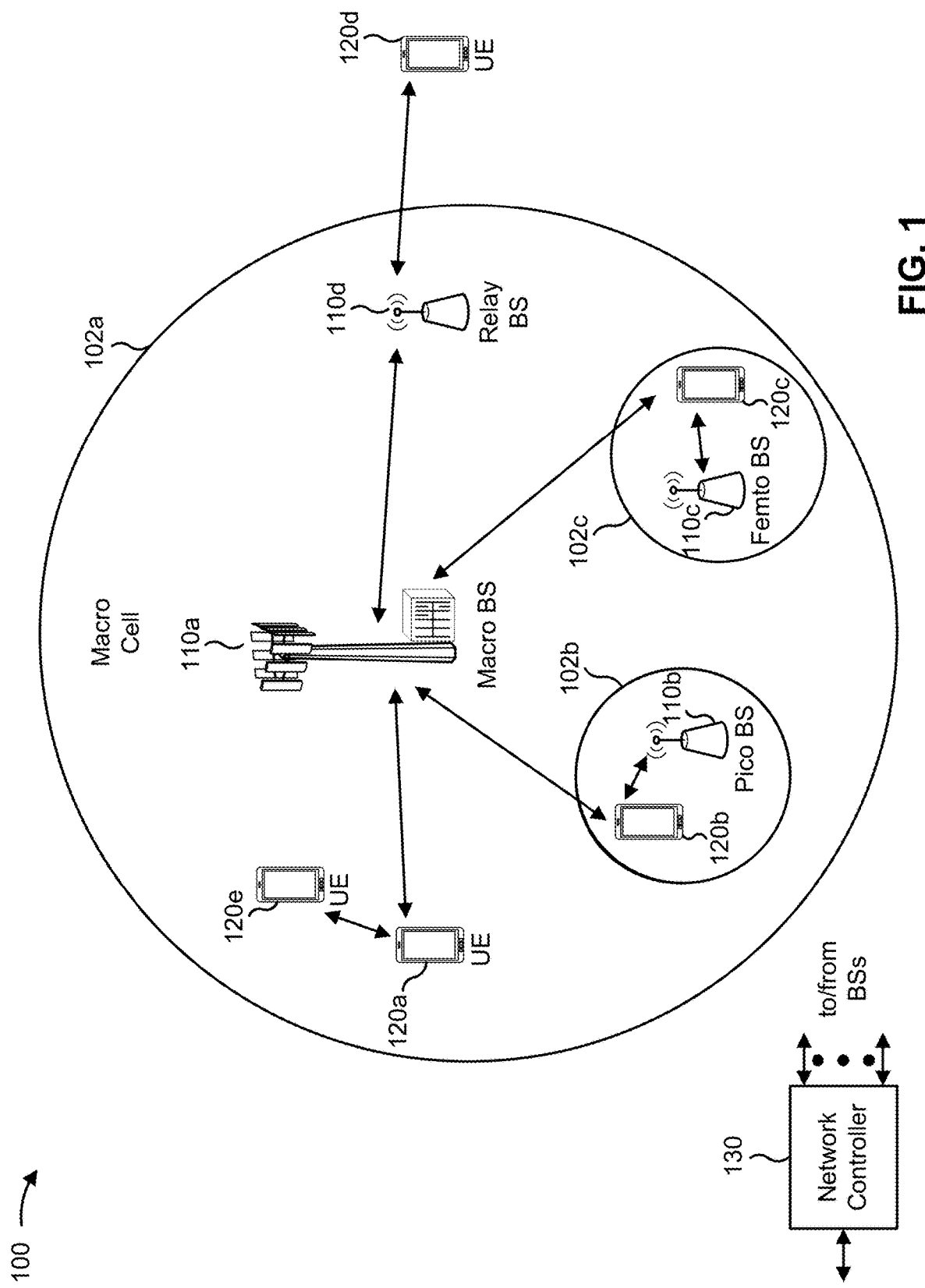
FIG. 1 is a diagram illustrating an example of a wireless network, in accordance with the present disclosure.

In some aspects, a UE may be configured with transmission configuration indicator (TCI) states that are associated with non-serving cell reference signals. In this case, updates to the TCI states and/or non-serving cell reference signals for the UE may be performed. For example, the non-serving cell reference signals to be monitored by the UE and/or the TCI states associated with the non-serving cell may be updated based at least in part on movement of the UE. However, an update relating to a non-serving cell reference signal that the UE has not previously tracked may require a longer time duration to be applied by the UE, as compared with an update to a serving cell reference signal or a non-serving cell reference signal that has been tracked by the UE. In a case in which the UE is configured with too short of a time duration between the update associated with a non-serving cell reference signal and a communication in which the update is applied, the non-serving cell reference signal measurements performed by the UE may be incorrect, which may result in unreliable cell handoff and/or cell reselection determinations. This may cause disruption and/or increase latency for downlink and/or uplink communications for the UE.

Some techniques and apparatuses described herein enable a UE to select an application time duration for an update associated with a non-serving cell reference signal based at least in part on a determination of whether the UE has tracked the reference signal. The UE may receive, from a base station, an indication of an update associated with a non-serving cell reference signal. The UE may select a first application time duration based at least in part on a determination that the non-serving cell reference signal has been tracked by the UE, or the UE may select a second application time duration based at least in part on a determination that the non-serving cell reference signal has not been tracked by the UE. The UE may apply the update associated with the non-serving cell reference signal after the selected application time duration. As a result, a longer application time duration may be utilized by the UE and the base station before applying the update to the non-serving cell reference signal in a case in which the non-serving cell reference signal has not been tracked by the UE. Thus, reliability of non-serving cell reference signal measurements performed by the UE and/or cell handover and/or cell reselection determinations may be increased, resulting in decreased disruptions and/or latency for downlink and/or uplink communications for the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As described in more detail elsewhere herein, the UE 120 may receive, from the base station 110, an indication As indicated above, FIG. 1 is provided as an example. Other examples may differ from what is described with regard to FIG. 1.

Figure 2:
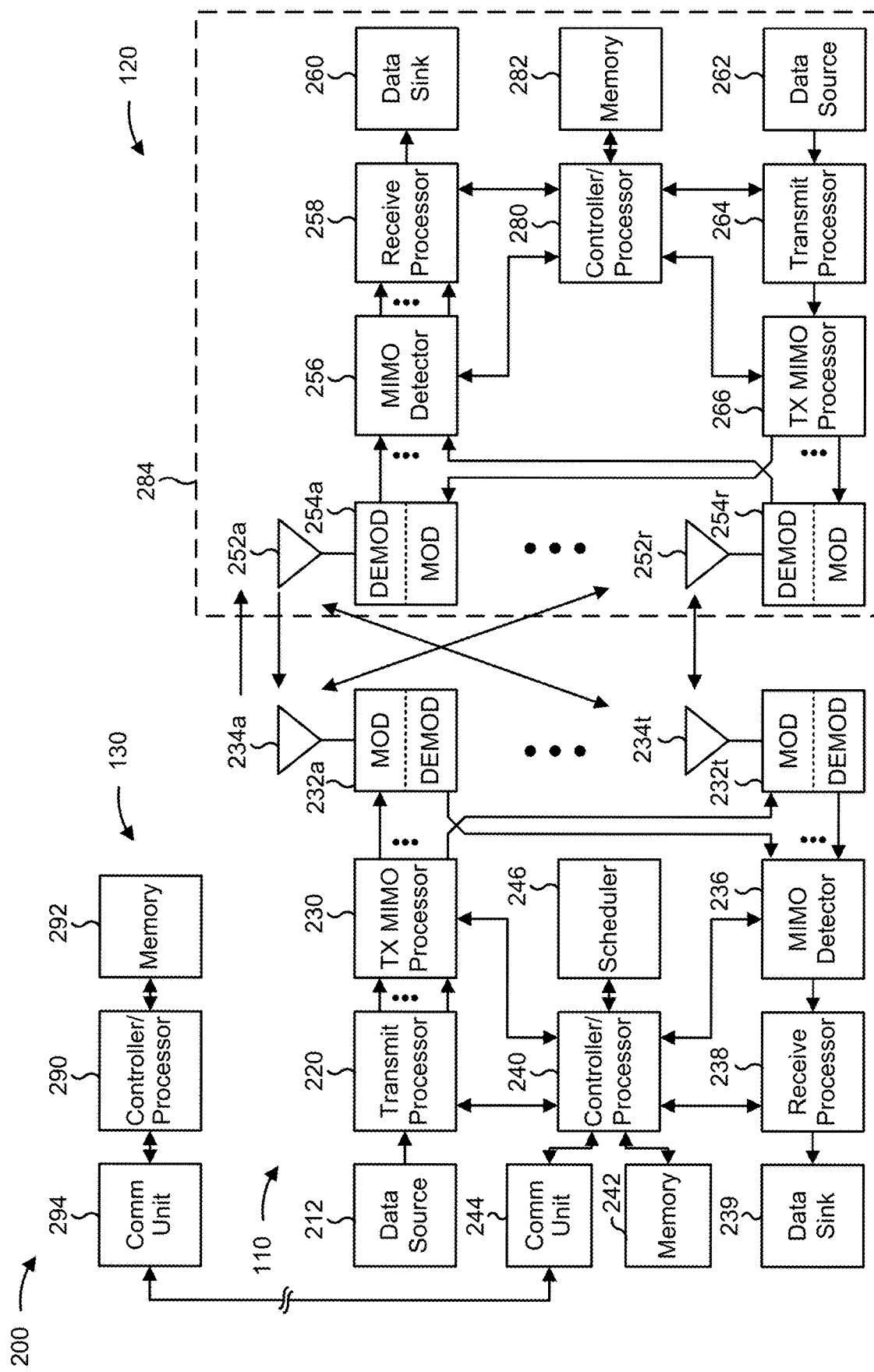
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with application time duration selection for a non-serving cell reference signal update, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE 120 includes means for receiving, from a base station, an indication of an update associated with a non-serving cell reference signal; means for selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and/or means for applying the update associated with the non-serving cell reference signal after the selected application time duration. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, an indication of an update associated with a non-serving cell reference signal; means for selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and/or means for applying the update associated with the non-serving cell reference signal after the selected application time duration. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may be located in the coverage areas of multiple base stations (e.g., multiple cells). The UE may select one of the cells as a serving cell for the UE based at least in part on various criteria, such as received signal strength (e.g., RSRP), received signal quality (e.g., RSRQ and/or signal-to-noise ratio (SNR)), and path loss, among other examples. Cells other than the serving cell, such as neighboring cells, may be referred to as non-serving cells.

The base station of the serving cell may configure TCI states associated with downlink beams transmitted by the base station. A TCI state may indicate a directionality or a characteristic of a downlink beam, such as one or more quasi co-location (QCL) properties of the downlink beam. A QCL property may include, for example, a Doppler shift, a Doppler spread, an average delay, a delay spread, or spatial receive parameters, among other examples. Different TCI states may be associated with respective downlink reference signal sets in the serving cell (for example, a synchronization signal block (SSB) and an aperiodic, periodic, or semi-persistent channel state information reference signal (CSI-RS)). In this case, the base station of the serving cell may indicate a transmit beam for a downlink communication via a TCI indication, and the UE may select a corresponding UE receive beam based at least in part on the TCI indication.

In addition to reference signals in the serving cell, a UE may be configured to measure non-serving cell reference signals associated with one or more non-serving cells. For example, cell handover or reselection may be performed based at least in part on comparisons of measurements of non-serving cell reference signals with measurements of serving cell reference signals. Although in some cases, TCI states may be configured only for serving cell beams/reference signals, in some aspects, TCI states may also be associated with non-serving cell reference signals. Associating TCI states with non-serving cell reference signals may provide various benefits relating to enhanced layer 1 (L1) (e.g., physical layer) and/or layer 2 (L2) (e.g., medium access control (MAC) layer) based inter-cell mobility. For example, by associating TCI states with non-serving cell reference signals, an L1-based reference signal measurement and reporting framework used in the serving cell may be extended to non-serving cell reference signals. Furthermore, associating TCI states with non-serving cell reference signals may enable faster handover of data and/or control channel communications by indicating, using a TCI indication, a beam of a non-serving cell to which the communications are being switched for the UE. In addition, associating a TCI state with a non-serving cell reference signal may be used to support enhanced measurement of a non-serving cell beam, for example using an aperiodic CSI-RS or a timing reference signal (TRS).

In a case in which TCI states are associated with non-serving cell reference signals, updates to the TCI states and/or non-serving cell reference signals for the UE may need to be performed (e.g., by the base station of the serving cell). For example, the non-serving cell reference signals to be monitored by the UE and/or the TCI states associated with the non-serving cell may be updated based at least in part on movement of the UE. However, an update relating to a non-serving cell reference signal that the UE has not previously tracked (e.g., a non-serving cell reference signal which the UE has not previously been configured to measure), may require a longer time duration to be applied by the UE, as compared with an update to a serving cell reference signal or a non-serving cell reference signal that has been tracked by the UE. For example, an update relating a non-serving cell reference signal which the has not previously tracked, may require a time duration in which the UE can perform time and/or frequency synchronization with the non-serving cell reference signal before the update can be applied by the UE. In a case in which the UE is configured with too short of a time duration between the update associated with a non-serving cell reference signal and a communication in which the update is applied, the non-serving cell reference signal measurements performed by the UE may be incorrect, which may result in unreliable cell handoff and/or cell reselection determinations. This may cause disruption and/or increase latency for downlink and/or uplink communications for the UE.

Some techniques and apparatuses described herein enable a UE to select an application time duration for an update associated with a non-serving cell reference signal based at least in part on a determination of whether the UE has tracked the reference signal. The application time duration is a time duration between the UE receiving the update (or the UE transmitting an acknowledgement of receiving the update), and the UE and base station applying the update. In some aspects, the UE may receive, from a base station, an indication of an update associated with a non-serving cell reference signal. The UE may select a first application time duration based at least in part on a determination that the non-serving cell reference signal has been tracked by the UE, or the UE may select a second application time duration based at least in part on a determination that the non-serving cell reference signal has not been tracked by the UE. The UE may apply the update associated with the non-serving cell reference signal after the selected application time duration. In some aspects, the second application time duration may be longer than the first application time duration. As a result, a longer application time duration may be utilized by the UE and the base station before applying the update to the non-serving cell reference signal in a case in which the non-serving cell reference signal has not been tracked by the UE. Thus, reliability of non-serving cell reference signal measurements performed by the UE and/or cell handover and/or cell reselection determinations may be increased, resulting in decreased disruptions and/or latency for downlink and/or uplink communications for the UE. Furthermore, selecting the first application time duration in a case in which the UE has tracked the non-serving cell reference signal may reduce delay in updating the non-serving cell reference signal, as compared to applying the second application time duration for all non-serving cell reference signal updates.

Figure 3:
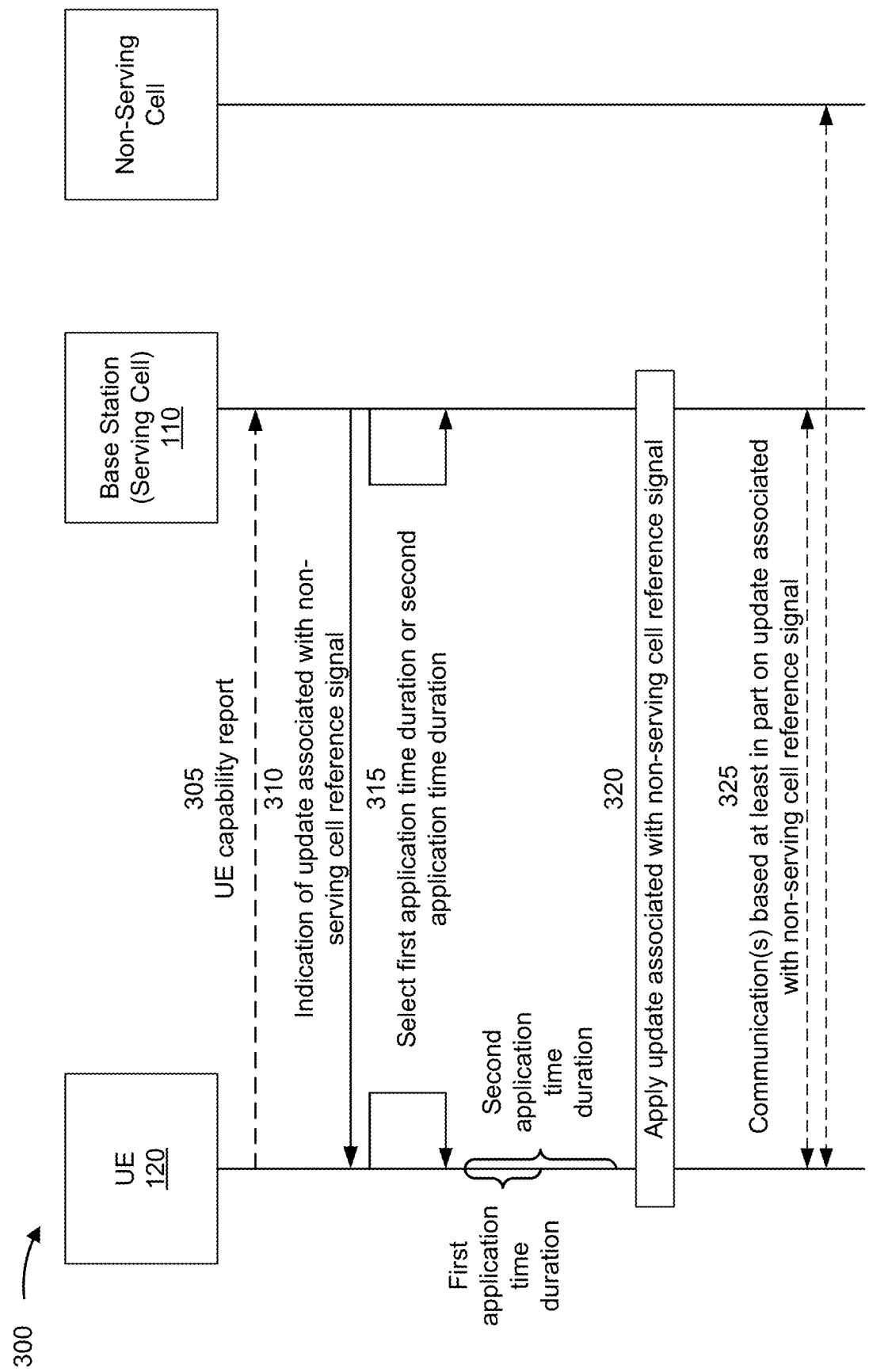
FIG. 3 is a diagram illustrating an example associated with application time selection for a non-serving cell reference signal update, in accordance with the present disclosure.

FIG. 3 is a diagram illustrating an example 300 associated with application time selection for a non-serving cell reference signal update, in accordance with the present disclosure. As shown in FIG. 3, example 300 includes communication between a base station 110, a UE 120, and a non-serving cell (e.g., a base station of a non-serving cell). In some aspects, the base station 110 may be a base station of a serving cell associated with the UE 120. In some aspects, the base station 110, the UE 120, and the non-serving cell may be included in a wireless network, such as wireless network 100. The UE 120 may communicate with the base station 110 and the non-serving cell via wireless access links, which may include uplinks and downlinks.

As shown in FIG. 3, and by reference number 305, in some aspects, the UE 120 may transmit, to the base station 110, a UE capability report that indicates a UE capability associated with an application time duration for updates associated with non-serving cell reference signals. The UE capability report may indicate a first duration value associated with a tracked non-serving cell reference signal and/or a second duration value associated with a non-tracked non-serving cell reference signal. A tracked non-serving cell reference signal is a non-serving cell reference signal that has previously been tracked by the UE 120, and a non-tracked non-serving cell reference signal is a non-serving cell reference signal that has not previously been tracked by the UE 120.

The first duration value may be a time duration in which the UE 120 is capable of processing an update associated with a tracked non-serving cell reference signal. For example, the first duration value may be based at least in part on a processing capability of the UE 120. The second duration value may be a time duration in which the UE 120 is capable of processing an update associated with a non-tracked non-serving cell reference signal. For example, second duration value may be based at least in part on a processing capability of the UE 120 and based at least in part on a time duration associated with the UE 120 performing time and frequency synchronization on a TCI state associated with a non-tracked non-serving cell reference signal. In some aspects, the second time duration may include at least a time duration associated with multiple occurrences of a non-serving cell reference signal. For example, the second duration value may be equal to the first duration value plus a multiple of a periodicity associated with the non-serving cell reference signal.

In some aspects, the first duration value may be used (e.g., by the base station 110 and the UE 120) as a first application time duration to be applied for updates to tracked non-serving cell reference signals, and the second duration value may be used (e.g., by the base station 110 and the UE 120) as a second application time duration to be applied for updates to non-tracked non-serving cell reference signals. In some aspects, the base station 110 (e.g., the serving cell base station 110) may configure the first application time duration based at least in part on the first duration value, and the base station 110 may configured the second application time duration based at least in part on the second duration value. For example, the base station 110 may determine a first application time duration that satisfies (e.g., is greater than or equal to) the first duration value, and the base station 110 may determine a second application time duration that satisfies (e.g., is greater than or equal to) the second duration value. In this case, the base station 110 may transmit, to the UE 120, a configuration including an indication of the first application time duration and an indication of the second application time duration.

In some aspects, the UE capability report may include indications of the first duration value and the second duration value. In some aspects, the UE capability report may include an indication of one of the first application time or the second application time, and the base station 110 may derive the other one of the first application time and the second application time from the indicated UE capability. For example, in some aspects, the UE capability report may include the first duration value associated with the UE capability for tracked non-serving cell reference signals, and the base station 110 may derive the second duration value (and/or the second application time duration) based at least in part on the indicated first duration value. For example, the base station 110 may determine the second duration value by adding a multiple (1) of the periodicity of a non-serving cell reference signal (RS periodicity) to the first duration value, e.g., second duration value=first duration value+t(RS periodicity).

In some aspects, the base station 110 may configure the first application time duration and the second application time duration independently from or in the absence of receiving the UE capability report from the UE 120. In some aspects, the first application time duration and the second application time duration may be pre-configured or determined by a rule. For example, in some aspects, the first application time duration and the second application time duration may be set in a wireless communication standard. In this case, the UE 120 may not transmit the UE capability report or may not indicate the first duration value and/or the second duration value in the UE capability report.

As further shown in FIG. 3, and by reference number 310, the UE 120 may receive, from the base station 110 an indication of an update associated with a non-serving cell reference signal. For example, the base station 110 may transmit the indication of the update associated with the non-serving cell reference signal to the UE 120 in a MAC control element (MAC-CE), downlink control information (DCI) (e.g., via a physical downlink control channel (PDCCH) communication), or in a radio resource control (RRC) message. In some aspects, the base station 110 may transmit different types of updates associated with non-serving cell reference signals using different types of communications (e.g., MAC-CE, DCI, and/or RRC). The UE 120 may receive the indication of the update associated with the non-serving cell reference signal. In some aspects, such as in a case in which the indication is transmitted via a MAC-CE and/or DCI, the UE 120 may transmit an acknowledgement to the base station 110 based at least in part on receiving the indication. For example, the UE 120 may transmit, to the base station 110, a hybrid automatic repeat request (HARQ) acknowledgement based at least in part on receiving the indication.

In some aspects, the indication of the update associated with the non-serving cell reference signal may include an indication of an update to the set of non-serving cell reference signals to be monitored or tracked by the UE 120. In some aspects, the indication of the update associated with the non-serving cell reference signal may include an indication of an update to the TCI state for the non-serving cell. For example, the indication may include an indication to update the TCI state for the non-serving cell to a TCI state associated with a particular non-serving cell reference signal.

In some aspects, the indication of the update associated with the non-serving cell reference signal may include a beam indication to use a TCI associated with a non-serving cell reference signal to receive at least one of a scheduled aperiodic reference signal or a scheduled physical downlink shared channel (PDSCH) communication. For example, the base station 110 may include the beam indication in DCI that schedules the aperiodic reference signal or the PDSCH communication for the UE 120. The beam indication may indicate the TCI state associated with the non-serving cell reference signal to identify, to the UE 120, the beam on which the scheduled aperiodic reference signal or the scheduled PDSCH communication is to be transmitted. In some aspects, the scheduled aperiodic reference signal may be an aperiodic CSI-RS or a TRS.

In some aspects, the indication of the update associated with the non-serving cell reference signal may include an indication to use the non-serving cell reference signal as a path loss reference signal for an uplink channel. In this case, the indication may indicate, to the UE 120, to estimate path loss based at least in part on measurements (e.g., RSRP measurements) performed on the non-serving cell reference signal and to determine a transmission power for an uplink communication on the uplink channel based at least in part on the path loss estimation determined from the measurements of the non-serving cell reference signal.

As further shown in FIG. 3, and by reference number 315, the UE 120 may select the first application time duration or the second application time duration based at least in part on a determination of whether the non-serving cell reference signal has been tracked by the UE. The UE 120 may select the first application time duration based at least in part on a determination that the non-serving cell reference signal has been tracked by the UE 120. The UE 120 may select the second application time duration based at least in part on a determination that the non-serving cell reference signal has not been tracked by the UE 120. The second application time duration may be longer than the first application time duration. In some aspects, the determination of whether the non-serving cell reference signal has been tracked by the UE 120 may be a determination of whether the UE 120 has previously tracked, monitored, measured, or used the non-serving cell reference signal.

In some aspects, the determination of whether the non-serving cell reference signal has been tracked by the UE 120 may be a determination of whether the UE 120 has been configured (or is currently configured) to monitor the non-serving cell reference signal, for example, for inter-cell mobility measurements. For example, the UE 120 may be configured to monitor certain non-serving cell reference signals for layer 3 (L3) (e.g., radio link control (RLC) layer) mobility measurements. Additionally, and/or alternatively, the UE 120 may be configured to monitor certain non-serving cell reference signals for L1 (e.g., physical layer) mobility measurements. The UE 120 may determine that the non-serving cell reference signal has been tracked in a case in which the UE 120 is currently or has previously been configured to monitor the non-serving cell reference signal. The UE 120 may determine that the non-serving cell reference signal has not been tracked in a case in which the UE 120 has not previously been configured to monitor the non-serving cell reference signal.

In some aspects, such as in a case in which the update is a beam indication to use the TCI state associated with the non-serving cell reference signal, the determination of whether the non-serving cell reference signal has been tracked may be based at least in part on a determination of whether at least one of a TRS or a CSI-RS (e.g., an aperiodic CSI-RS) has been configured for the UE on the TCI state associated with the non-serving cell reference signal. For example, in the case in which a TRS and/or a CSI-RS has previously been configured on the TCI state associated with the non-serving cell reference signal, the UE 120 may have previously performed time and frequency synchronization on the TCI state. The UE 120 may determine that the non-serving cell reference signal has been tracked in a case in which a TRS and/or a CSI-RS has previously been configured on the TCI state associated with the non-serving cell reference signal. The UE 120 may determine that the non-serving cell reference signal has not been tracked in a case in which a TRS and/or a CSI-RS has not previously been configured on the TCI state associated with the non-serving cell reference signal.

In some aspects, such as in a case in which the update is an indication to use the non-serving cell reference signal as a path loss reference signal, the determination of whether the non-serving cell reference signal has been tracked may be based at least in part on a determination of whether the non-serving cell reference signal has been previously configured (or is currently configured) as a path loss reference signal for the UE 120. A certain number of reference signals (e.g., four) may be configured as path loss reference signals for the UE 120. The UE 120 may determine that the non-serving cell reference signal has been tracked in a case in which the non-serving cell reference signal has been configured or currently is configured as one of the path loss reference signals for the UE 120. The UE 120 may determine that the non-serving cell reference signal has not been tracked in a case in which the non-serving cell reference signal has not been configured as one of the path loss reference signals for the UE 120.

As further shown by reference number 315, the base station 110 may also select the first application time duration or the second application time duration based at least in part on a determination of whether the non-serving cell reference signal has been tracked by the UE 120. The base station 110 may determine whether the non-serving cell reference signal has been tracked by the UE 120, similarly to the UE 120 as described above.

As further shown in FIG. 3, and by reference number 320, the UE 120 may apply the update associated with the non-serving cell reference signal after the selected application time duration (e.g., the first application time duration or the second application time duration). The base station 110 may also apply the update associated with the non-serving cell reference signal after the selected application time duration (e.g., the first application time duration or the second application time duration). In some aspects, the selected application time duration may be counted from a time (e.g., slot) at which the UE 120 receives the indication of the update (e.g., a time at which the base station 110 transmits the indication of the update). In some aspects, the selected application time duration may be counted from a time (e.g., slot) at which the UE 120 transmits the acknowledgement based at least in part on receiving the indication of the update (e.g., a time at which the base station 110 receives the acknowledgement).

As further shown in FIG. 3, and by reference number 325, applying the update associated with the non-serving cell reference signal may include one or more communications, between the UE 120 and the base station 110 and/or between the UE 120 and the non-serving cell (e.g., a base station of the non-serving cell), based at least in part on the update associated with the non-serving cell reference signal. The one or more communications may be performed any time after the selected application time duration.

In some aspects, such as in a case in which the update is an update to include the non-serving cell reference signal in the set of non-serving cell reference signals monitored by the UE 120, the UE 120 may begin receiving the non-serving cell reference signal from the non-serving cell (e.g., from a base station in the non-serving cell) after the selected application time duration. For example, the UE 120 may periodically receive the non-serving cell reference signal from the non-serving cell and perform measurements (e.g., RSRP measurements, RSRQ measurements, and/or SNR measurements) of the non-serving cell reference signal.

In some aspects, such as in a case in which the indication of the update is an indication to update the TCI state of the non-serving cell to the TCI state associated with the non-serving cell reference signal, the update to the TCI state of the non-serving cell may take effect, for the UE 120 and the base station 110, after the selected application time duration. The UE 120 may monitor the non-serving cell reference signal from the non-serving cell, for example, to perform L1 and/or L3 mobility measurements. In some aspects, the base station 110 may transmit, to the UE 120 at a time after the selected application, an indication of a handover for a control and/or data channel to the updated TCI state for the non-serving cell.

In some aspects, such as in a case, in which the indication of the update includes a beam indication to use the TCI state associated with the non-serving cell reference signal for receiving a scheduled aperiodic reference signal or a scheduled PDSCH communication, the UE 120 may receive the scheduled aperiodic reference signal (e.g., an aperiodic CSI-RS or a TRS)) or the scheduled PDSCH communication on a receive beam corresponding to a transmit beam identified by the TCI state after the selected application time duration. In this case, the base station 110 may schedule (e.g., via the DCI including the beam indication) the aperiodic reference signal or the PDSCH communication to be transmitted to the UE 120 after the selected application time duration. In some aspects, the UE 120 may receive, from the non-serving cell (e.g., from the base station in the non-serving cell), a scheduled TRS and/or a scheduled aperiodic CSI-RS on the beam identified by the TCI state associated with the non-serving cell reference signal. In this case, the UE 120 may perform enhanced measurements based on the TRS and/or the aperiodic CSI-RS transmitted from the non-serving cell. In some aspects, the UE 120 may receive a scheduled PDSCH communication from the base station 110 or from the non-serving cell on the beam identified by the TCI state associated with the non-serving cell reference signal.

In some aspects, such as in a case in which the indication of the update includes an indication to use the non-serving cell reference signal as a path loss reference signal for an uplink channel, the UE 120 may determine, after the selected application time duration, a transmission power for an uplink communication on the uplink channel from a path loss estimation determined based at least in part on measurements (e.g., RSRP measurements) of the non-serving cell reference signal. The UE 120 may transmit the uplink communication to the base station 110 using the transmission power determined from the path loss estimation. The path loss estimation may measure multiple occurrences of the path loss reference signal (e.g., the non-serving cell reference signal) to estimate an averaged path loss value. In a case in which the non-serving cell reference signal has not already been configured as a path loss reference signal (e.g., the non-serving cell reference signal has not been tracked by the UE 120) and the second application time duration is selected, the second application time duration may include at least a time duration associated with multiple occurrences of the non-serving cell reference signal. In this case, the second application time duration may provide a "warm-up" time in which the UE 120 may begin measuring the occurrences of the non-serving cell reference signal, such that the UE 120 may determine the path loss estimation and the transmission power after the second application time duration.

As described above in connection with FIG. 3, the UE 120 may receive, from the base station 110, an indication of an update associated with a non-serving cell reference signal. The UE 120 may select a first application time duration based at least in part on a determination that the non-serving cell reference signal has been tracked by the UE 120, or the UE 120 may select a second application time duration based at least in part on a determination that the non-serving cell reference signal has not been tracked by the UE 120. The UE 120 may apply the update associated with the non-serving cell reference signal after the selected application time duration. In some aspects, the second application time duration may be longer than the first application time duration. As a result, a longer application time duration may be utilized by the UE 120 and the base station 110 before applying the update to the non-serving cell reference signal in a case in which the non-serving cell reference signal has not been tracked by the UE 120. Thus, reliability of non-serving cell reference signal measurements performed by the UE 120 may be increased, resulting in decreased disruptions and/or latency for downlink and/or uplink communications for the UE 120. Furthermore, selecting the first application time duration in a case in which the UE 120 has tracked the non-serving cell reference signal may reduce delay in updating the non-serving cell reference signal, as compared to applying the second application time duration for all non-serving cell reference signal updates.

As indicated above, FIG. 3 is provided as an example. Other examples may differ from what is described with respect to FIG. 3.

Figure 4:
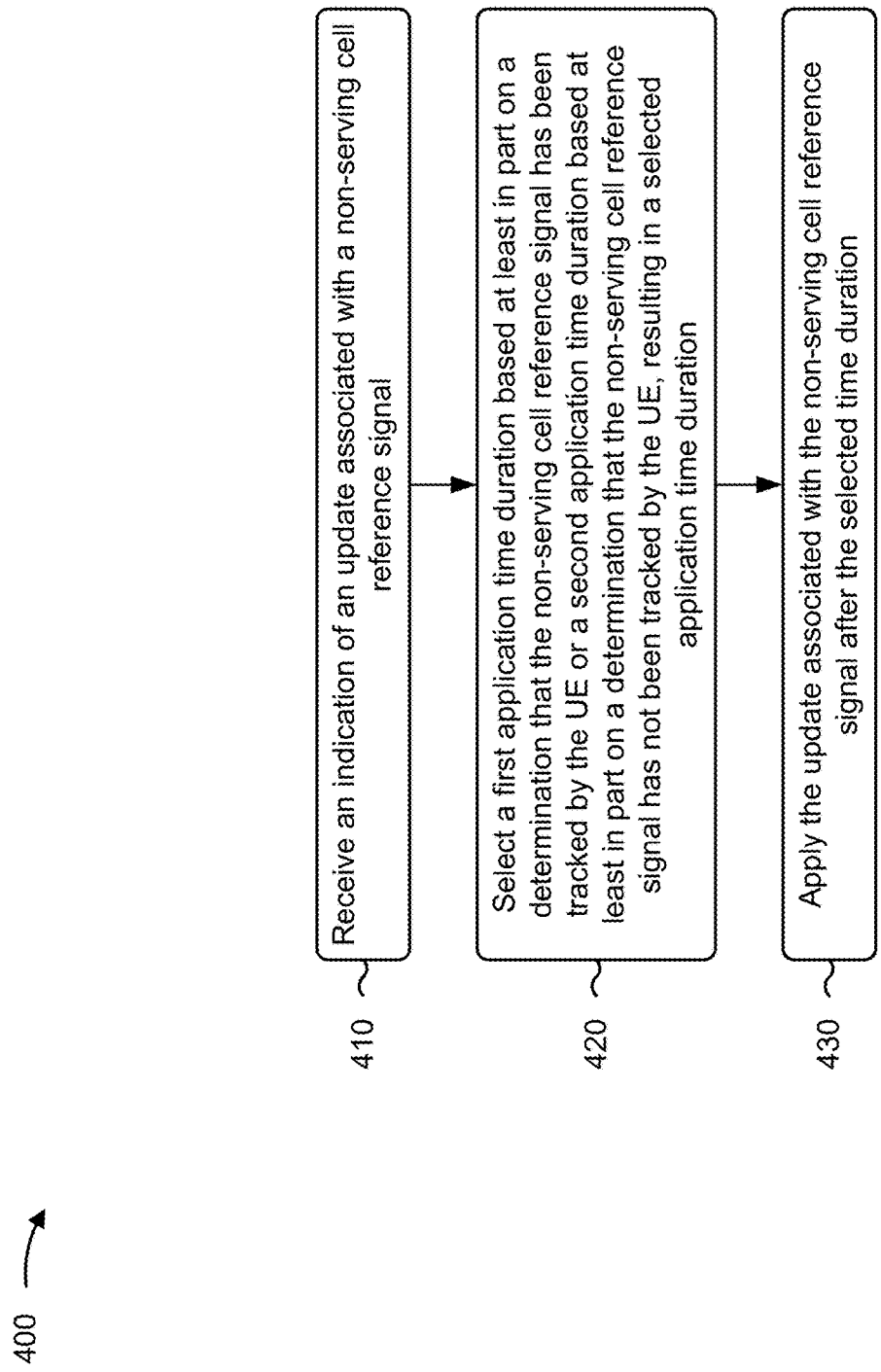
FIGS. 4-5 are diagrams illustrating example processes associated with application time selection for a non-serving cell reference signal update, in accordance with the present disclosure.

FIG. 4 is a diagram illustrating an example process 400 performed, for example, by a UE, in accordance with the present disclosure. Example process 400 is an example where the UE (e.g., UE 120) performs operations associated with application time selection for a non-serving cell reference signal update.

As shown in FIG. 4, in some aspects, process 400 may include receiving, from a base station, an indication of an update associated with a non-serving cell reference signal (block 410). For example, the UE (e.g., using reception component 602, depicted in FIG. 6) may receive, from a base station, an indication of an update associated with a non-serving cell reference signal, as described above.

As further shown in FIG. 4, in some aspects, process 400 may include selecting a first application time duration based at least in part on a determination that the non-serving cell reference signal has been tracked by the UE or a second application time duration based at least in part on a determination that the non-serving cell reference signal has not been tracked by the UE, resulting in a selected application time duration (block 420). For example, the UE (e.g., using selection component 608, depicted in FIG. 6) may select a first application time duration based at least in part on a determination that the non-serving cell reference signal has been tracked by the UE or a second application time duration based at least in part on a determination that the non-serving cell reference signal has not been tracked by the UE, resulting in a selected application time duration, as described above.

As further shown in FIG. 4, in some aspects, process 400 may include applying the update associated with the non-serving cell reference signal after the selected application time duration (block 430). For example, the UE (e.g., using application component 610, depicted in FIG. 6) may apply the update associated with the non-serving cell reference signal after the selected application time duration, as described above.

Process 400 may include additional aspects, such as any single aspect or any combination of aspects described below and/or in connection with one or more other processes described elsewhere herein.

In a first aspect, selecting application time duration is counted from a time at which the UE receives the indication.

In a second aspect, process 400 includes transmitting, to the base station, an acknowledgment based at least in part on receiving the indication, and the selected application time duration is counted from a time at which the UE transmits the acknowledgment.

In a third aspect, alone or in combination with one or more of the first and second aspects, the indication includes an indication to update a TCI state for a non-serving cell to a TCI state associated with the non-serving cell reference signal.

In a fourth aspect, alone or in combination with one or more of the first through third aspects, a determination of whether the non-serving cell reference signal has been tracked by the UE is based at least in part on a determination of whether the UE has been configured to monitor the non-serving cell reference signal for inter-cell mobility measurements.

In a fifth aspect, alone or in combination with one or more of the first through fourth aspects, the indication includes a beam indication to use a TCI state associated with the non-serving cell reference signal for receiving at least one of a scheduled aperiodic reference signal or a scheduled PDSCH communication.

In a sixth aspect, alone or in combination with one or more of the first through fifth aspects, a determination of whether the non-serving cell reference signal has been tracked by the UE is based at least in part on a determination of whether at least one of a tracking reference signal or a channel state information reference signal has been configured for the UE on the TCI state associated with the non-serving cell reference signal.

In a seventh aspect, alone or in combination with one or more of the first through sixth aspects, the second application time duration is longer than the first application time duration, and the second application time duration includes at least a time duration associated with the UE performing time and frequency synchronization on the TCI state associated with the non-serving cell reference signal.

In an eighth aspect, alone or in combination with one or more of the first through seventh aspects, applying the update associated with the non-serving cell reference signal includes receiving, after the selected application time duration, the at least one of the scheduled aperiodic reference signal or the scheduled PDSCH communication using the TCI state associated with the non-serving cell reference signal.

In a ninth aspect, alone or in combination with one or more of the first through eighth aspects, the indication includes an indication to use the non-serving cell reference signal as a path loss reference signal for an uplink channel.

In a tenth aspect, alone or in combination with one or more of the first through ninth aspects, a determination of whether the non-serving cell reference signal has been tracked by the UE is based at least in part on a determination of whether the non-serving cell reference signal has been configured as a path loss reference signal for the UE.

In an eleventh aspect, alone or in combination with one or more of the first through tenth aspects, the second application time duration is longer than the first application time duration, and the second application time duration includes at least a time duration associated with multiple occurrences of the non-serving cell reference signal.

In a twelfth aspect, alone or in combination with one or more of the first through eleventh aspects, applying the update associated with the non-serving cell reference signal includes transmitting, after the selected application time duration, an uplink communication on the uplink channel using a transmission power determined from a path loss estimation based at least in part on measurements of the non-serving cell reference signal.

In a thirteenth aspect, alone or in combination with one or more of the first through twelfth aspects, process 400 includes transmitting, to the base station, a UE capability report indicating at least one of a first duration value associated with a tracked non-serving cell reference signal or a second duration value associated with a non-tracked non-serving cell reference signal, wherein at least one of the first application time duration or the second application time duration is based at least in part on the at least one of the first duration value or the second duration value.

In a fourteenth aspect, alone or in combination with one or more of the first through thirteenth aspects, the UE capability report indicates the first duration value, the first application time duration is based at least in part on the first duration value, and the second application time duration is determined based at least in part on the first application time duration.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
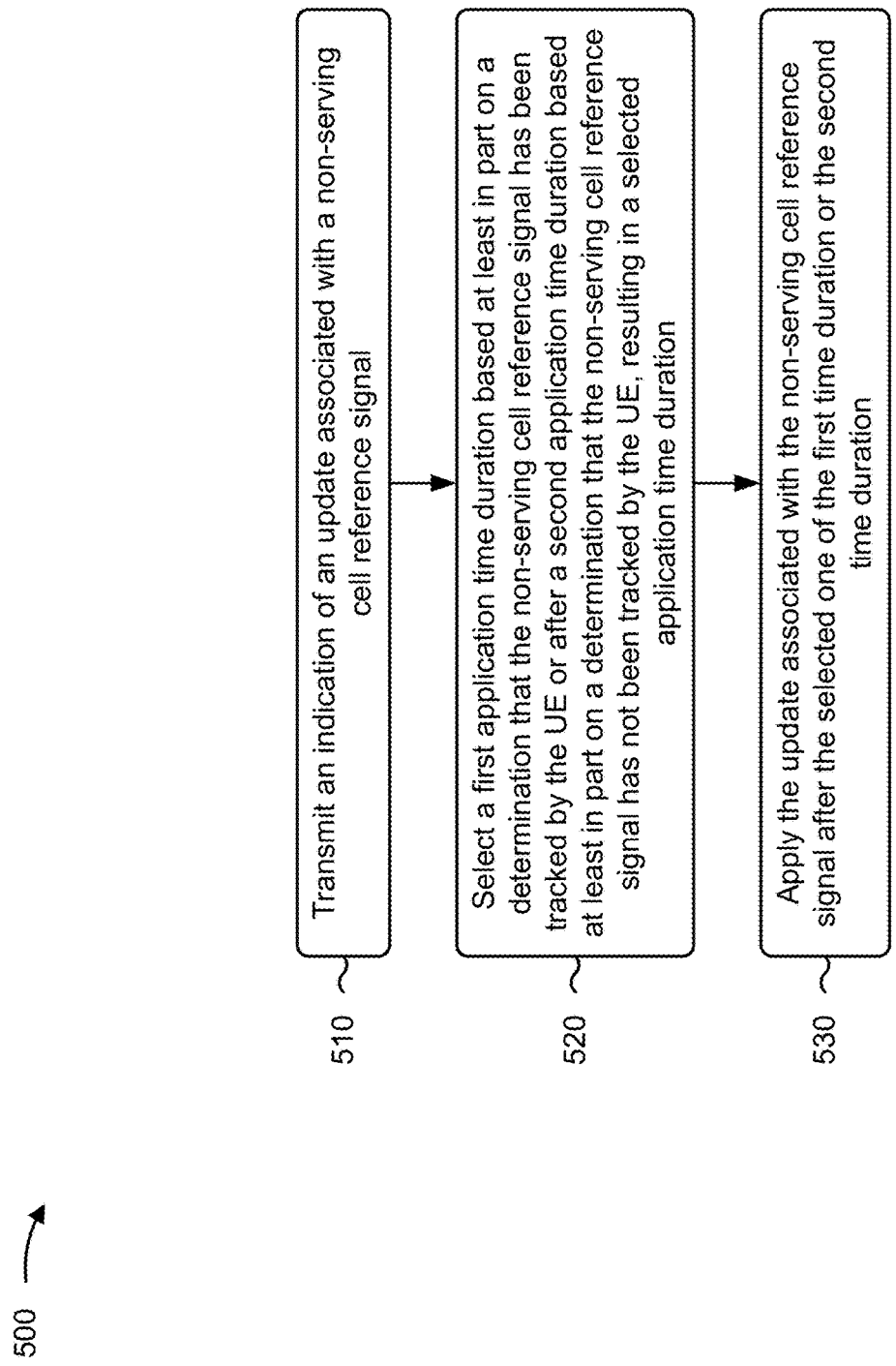

FIG. 5 is a diagram illustrating an example process 500 performed, for example, by a base station, in accordance with the present disclosure. Example process 500 is an example where the base station (e.g., base station 110) performs operations associated with application time selection for a non-serving cell reference signal update.

As shown in FIG. 5, in some aspects, process 500 may include transmitting, to a UE, an indication of an update associated with a non-serving cell reference signal (block 510). For example, the base station (e.g., using transmission component 704, depicted in FIG. 7) may transmit, to a UE, an indication of an update associated with a non-serving cell reference signal, as described above.

As further shown in FIG. 5, in some aspects, process 500 may include selecting a first application time duration based at least in part on a determination that the non-serving cell reference signal has been tracked by the UE or a second application time duration based at least in part on a determination that the non-serving cell reference signal has not been tracked by the UE, resulting in a selected application time duration (block 520). For example, the base station (e.g., using selection component 708, depicted in FIG. 7) may select a first application time duration based at least in part on a determination that the non-serving cell reference signal has been tracked by the UE or a second application time duration based at least in part on a determination that the non-serving cell reference signal has not been tracked by the UE, resulting in a selected application time duration, as described above.

As further shown in FIG. 5, in some aspects, process 500 may include applying the update associated with the non-serving cell reference signal after the selected application time duration (block 530). For example, the base station (e.g., using application component 710, depicted in FIG. 7) may apply the update associated with the non-serving cell reference signal after the selected application time duration, as described above.

Process 500 may include additional aspects, such as any single aspect or any combination of aspects described below and/or in connection with one or more other processes described elsewhere herein.

In a first aspect, selecting application time duration is counted from a time at which the base station transmits the indication.

In a second aspect, process 500 includes receiving, from the UE, an acknowledgment associated with the indication, and the selected application time duration is counted from a time at which the base station receives the acknowledgment.

In a third aspect, alone or in combination with one or more of the first and second aspects, the indication includes an indication to update a TCI state for a non-serving cell to a TCI state associated with the non-serving cell reference signal.

In a fourth aspect, alone or in combination with one or more of the first through third aspects, a determination of whether the non-serving cell reference signal has been tracked by the UE is based at least in part on a determination of whether the UE has been configured to monitor the non-serving cell reference signal for inter-cell mobility measurements.

In a fifth aspect, alone or in combination with one or more of the first through fourth aspects, the indication includes a beam indication to use a TCI state associated with the non-serving cell reference signal for receiving at least one of a scheduled aperiodic reference signal or a scheduled PDSCH communication.

In a sixth aspect, alone or in combination with one or more of the first through fifth aspects, a determination of whether the non-serving cell reference signal has been tracked by the UE is based at least in part on a determination of whether at least one of a tracking reference signal or a channel state information reference signal has been configured for the UE on the TCI state associated with the non-serving cell reference signal.

In a seventh aspect, alone or in combination with one or more of the first through sixth aspects, the second application time duration is longer than the first application time duration, and the second application time duration includes at least a time duration associated with the UE performing time and frequency synchronization on the TCI state associated with the non-serving cell reference signal.

In an eighth aspect, alone or in combination with one or more of the first through seventh aspects, applying the update associated with the non-serving cell reference signal includes scheduling the at least one of the scheduled aperiodic reference signal or the scheduled PDSCH communication to be transmitted to the UE using the TCI state associated with the non-serving cell reference signal after the selected application time duration.

In a ninth aspect, alone or in combination with one or more of the first through eighth aspects, the indication includes an indication to use the non-serving cell reference signal as a path loss reference signal for an uplink channel.

In a tenth aspect, alone or in combination with one or more of the first through ninth aspects, a determination of whether the non-serving cell reference signal has been tracked by the UE is based at least in part on a determination of whether the non-serving cell reference signal has been configured as a path loss reference signal for the UE.

In an eleventh aspect, alone or in combination with one or more of the first through tenth aspects, the second application time duration is longer than the first application time duration, and the second application time duration includes at least a time duration associated with multiple occurrences of the non-serving cell reference signal.

In a twelfth aspect, alone or in combination with one or more of the first through eleventh aspects, applying the update associated with the non-serving cell reference signal includes receiving, from the UE after the selected application time duration, an uplink communication on the uplink channel transmitted using a transmission power determined from a path loss estimation based at least in part on measurements of the non-serving cell reference signal.

In a thirteenth aspect, alone or in combination with one or more of the first through twelfth aspects, process 500 includes receiving, from the UE, a UE capability report indicating at least one of a first duration value associated with a tracked non-serving cell reference signal or a second duration value associated with a non-tracked non-serving cell reference signal, and determining at least one of the first application time duration or the second application time duration based at least in part on the at least one of the first duration value or the second duration value.

In a fourteenth aspect, alone or in combination with one or more of the first through thirteenth aspects, the UE capability report indicates the first duration value, and determining at least one of the first application time duration or the second application time duration includes determining the first application time duration based at least in part on the first duration value, deriving the second duration value from the first duration value, and determining the second application time duration based at least in part on the second duration.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
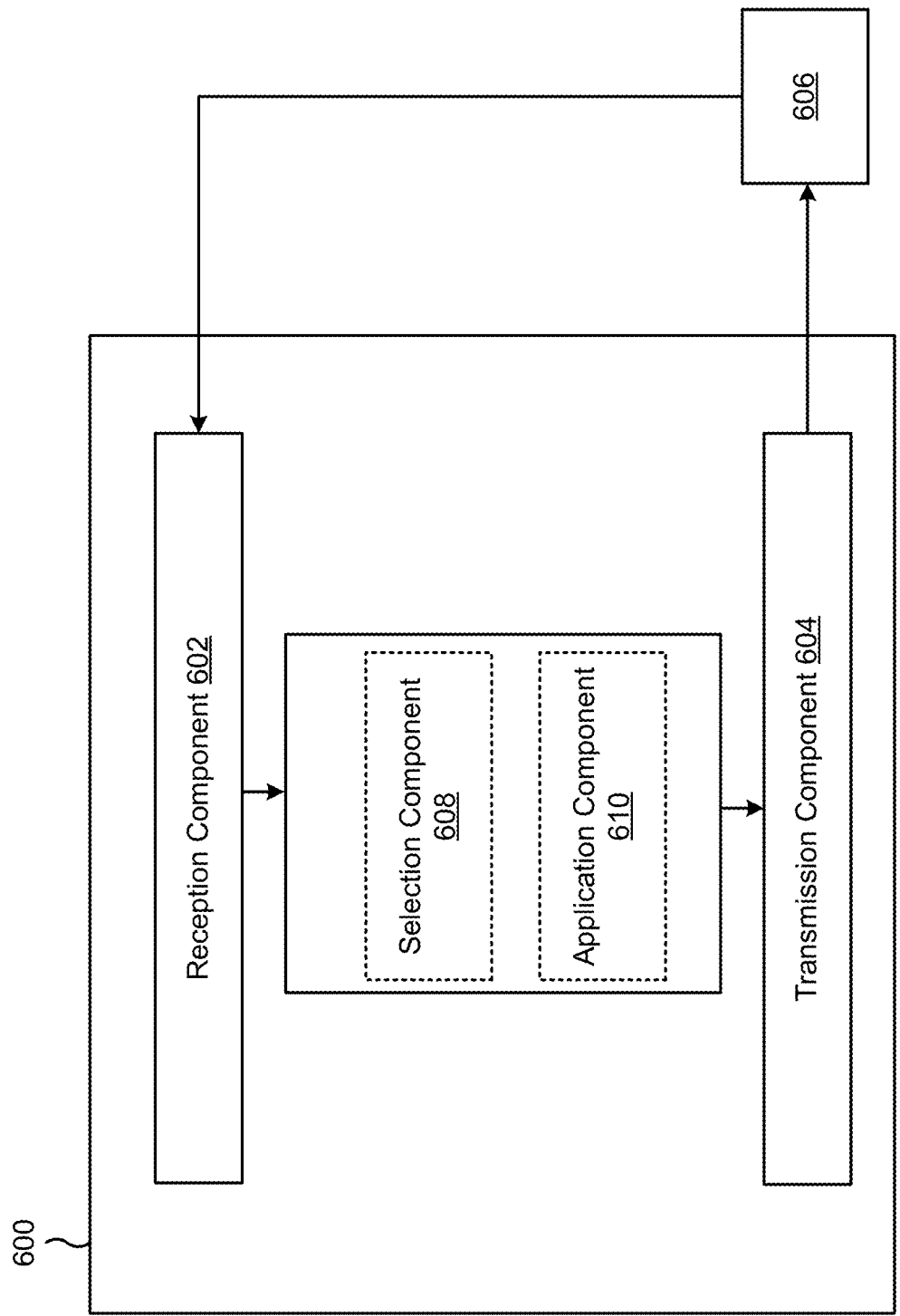
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include one or more of a selection component 608 or an application component 610, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, an indication of an update associated with a non-serving cell reference signal. The selection component 608 may select a first application time duration based at least in part on a determination that the non-serving cell reference signal has been tracked by the UE or a second application time duration based at least in part on a determination that the non-serving cell reference signal has not been tracked by the UE, resulting in a selected application time duration. The application component 610 may apply the update associated with the non-serving cell reference signal after the selected application time duration.

The transmission component 604 may transmit, to the base station, an acknowledgment based at least in part on receiving the indication, wherein the selected application time duration is counted from a time at which the UE transmits the acknowledgment.

The transmission component 604 may transmit, to the base station, a UE capability report indicating at least one of a first duration value associated with a tracked non-serving cell reference signal or a second duration value associated with a non-tracked non-serving cell reference signal, wherein at least one of the first application time duration or the second application time duration is based at least in part on the at least one of the first duration value or the second duration value.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
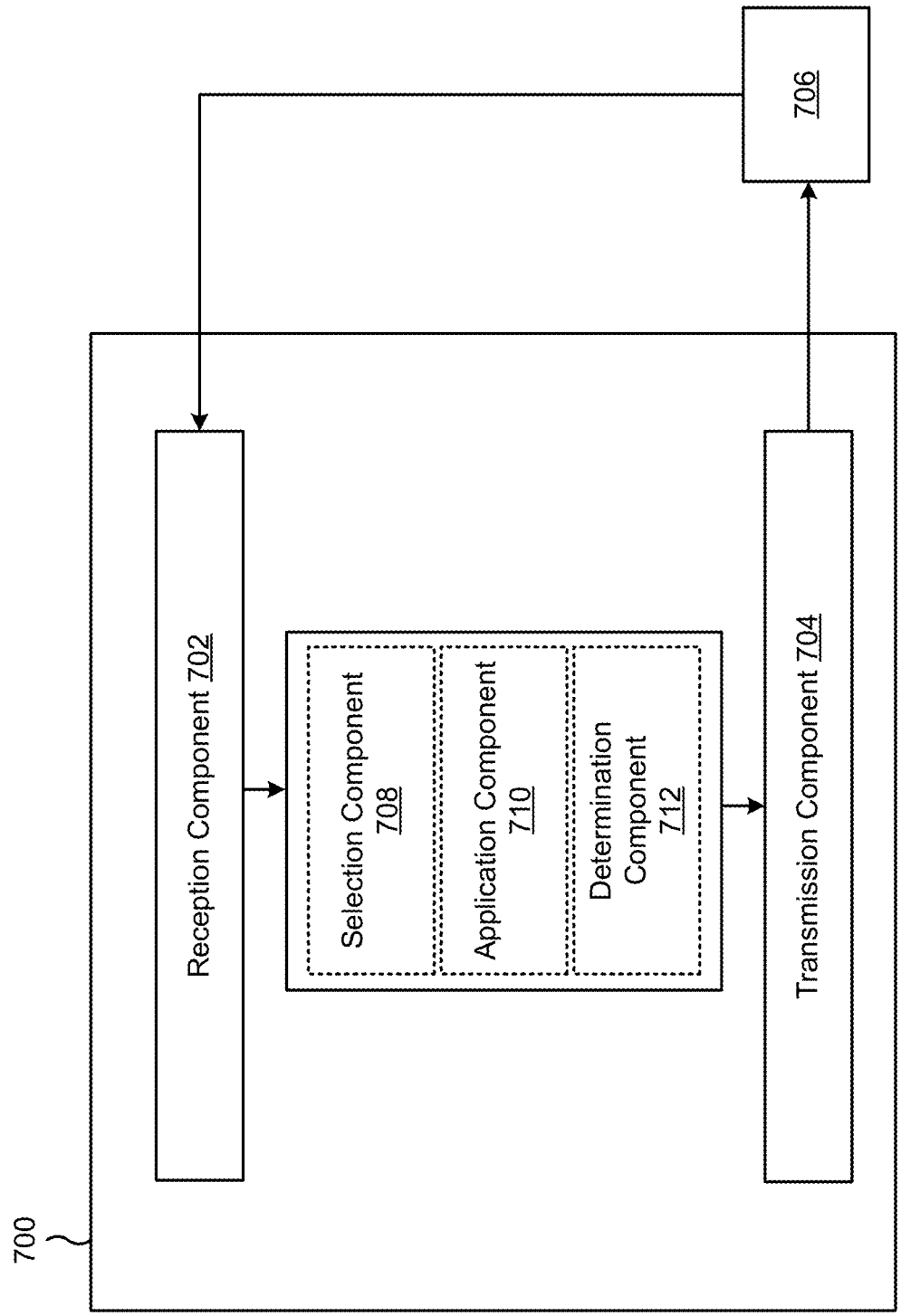

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a selection component 708, an application component 710, or a determination component 712, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, an indication of an update associated with a non-serving cell reference signal. The selection component 708 may select a first application time duration based at least in part on a determination that the non-serving cell reference signal has been tracked by the UE or a second application time duration based at least in part on a determination that the non-serving cell reference signal has not been tracked by the UE, resulting in a selected application time duration. The application component 710 may apply the update associated with the non-serving cell reference signal after the selected application time duration.

The reception component 702 may receive, from the UE, an acknowledgment associated with the indication, wherein the selected application time duration is counted from a time at which the base station receives the acknowledgment.

The reception component 702 may receive, from the UE, a UE capability report indicating at least one of a first duration value associated with a tracked non-serving cell reference signal or a second duration value associated with a non-tracked non-serving cell reference signal.

The determination component 712 may determine at least one of the first application time duration or the second application time duration based at least in part on the at least one of the first duration value or the second duration value.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, an indication of an update associated with a non-serving cell reference signal; selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and applying the update associated with the non-serving cell reference signal after the selected application time duration.

Aspect 2: The method of Aspect 1, wherein selected application time duration is counted from a time at which the UE receives the indication.

Aspect 3: The method of Aspect 1, further comprising: transmitting, to the base station, an acknowledgment based at least in part on receiving the indication, wherein the selected application time duration is counted from a time at which the UE transmits the acknowledgment.

Aspect 4: The method of any of Aspects 1-3, wherein the indication includes an indication to update a transmission configuration indicator (TCI) state for a non-serving cell to a TCI state associated with the non-serving cell reference signal.

Aspect 5: The method of Aspect 4, wherein a determination of whether the non-serving cell reference signal has been tracked by the UE is based at least in part on a determination of whether the UE has been configured to monitor the non-serving cell reference signal for inter-cell mobility measurements.

Aspect 6: The method of any of Aspects 1-5, wherein the indication includes a beam indication to use a transmission configuration indicator (TCI) state associated with the non-serving cell reference signal for receiving at least one of a scheduled aperiodic reference signal or a scheduled physical downlink shared channel (PDSCH) communication.

Aspect 7: The method of Aspect 6, wherein a determination of whether the non-serving cell reference signal has been tracked by the UE is based at least in part on a determination of whether at least one of a tracking reference signal or a channel state information reference signal has been configured for the UE on the TCI state associated with the non-serving cell reference signal.

Aspect 8: The method of Aspect 7, wherein the second application time duration is longer than the first application time duration, and the second application time duration includes at least a time duration associated with the UE performing time and frequency synchronization on the TCI state associated with the non-serving cell reference signal.

Aspect 9: The method of any of Aspects 6-8, wherein applying the update associated with the non-serving cell reference signal comprises: receiving, after the selected application time duration, the at least one of the scheduled aperiodic reference signal or the scheduled PDSCH communication using the TCI state associated with the non-serving cell reference signal.

Aspect 10: The method of any of Aspects 1-9, wherein the indication includes an indication to use the non-serving cell reference signal as a path loss reference signal for an uplink channel.

Aspect 11: The method of Aspect 10, wherein a determination of whether the non-serving cell reference signal has been tracked by the UE is based at least in part on a determination of whether the non-serving cell reference signal has been configured as a path loss reference signal for the UE.

Aspect 12: The method of Aspect 11, wherein the second application time duration is longer than the first application time duration, and the second application time duration includes at least a time duration associated with multiple occurrences of the non-serving cell reference signal.

Aspect 13: The method of any of Aspects 10-12, wherein applying the update associated with the non-serving cell reference signal comprises: transmitting, after the selected application time duration, an uplink communication on the uplink channel using a transmission power determined from a path loss estimation based at least in part on measurements of the non-serving cell reference signal.

Aspect 14: The method of any of Aspects 1-13, further comprising: transmitting, to the base station, a UE capability report indicating at least one of a first duration value associated with a tracked non-serving cell reference signal or a second duration value associated with a non-tracked non-serving cell reference signal, wherein at least one of the first application time duration or the second application time duration is based at least in part on the at least one of the first duration value or the second duration value.

Aspect 15: The method of Aspect 14, wherein the UE capability report indicates the first duration value, the first application time duration is based at least in part on the first duration value, and the second application time duration is determined based at least in part on the first application time duration.

Aspect 16: A method of wireless communication performed by a base station, comprising: transmitting, to a user equipment (UE), an indication of an update associated with a non-serving cell reference signal; selecting a first application time duration based at least in part on a determination that the non-serving cell reference signal has been tracked by the UE or a second application time duration based at least in part on a determination that the non-serving cell reference signal has not been tracked by the UE, resulting in a selected application time duration; and applying the update associated with the non-serving cell reference signal after the selected application time duration.

Aspect 17: The method of Aspect 16, wherein selected application time duration is counted from a time at which the base station transmits the indication.

Aspect 18: The method of Aspect 16, further comprising: receiving, from the UE, an acknowledgment associated with the indication, wherein the selected application time duration is counted from a time at which the base station receives the acknowledgment.

Aspect 19: The method of any of Aspects 16-18, wherein the indication includes an indication to update a transmission configuration indicator (TCI) state for a non-serving cell to a TCI state associated with the non-serving cell reference signal.

Aspect 20: The method of Aspect 19, wherein a determination of whether the non-serving cell reference signal has been tracked by the UE is based at least in part on a determination of whether the UE has been configured to monitor the non-serving cell reference signal for inter-cell mobility measurements.

Aspect 21: The method of any of Aspects 16-20, wherein the indication includes a beam indication to use a transmission configuration indicator (TCI) state associated with the non-serving cell reference signal for receiving at least one of a scheduled aperiodic reference signal or a scheduled physical downlink shared channel (PDSCH) communication.

Aspect 22: The method of Aspect 21, wherein a determination of whether the non-serving cell reference signal has been tracked by the UE is based at least in part on a determination of whether at least one of a tracking reference signal or a channel state information reference signal has been configured for the UE on the TCI state associated with the non-serving cell reference signal.

Aspect 23: The method of Aspect 22, wherein the second application time duration is longer than the first application time duration, and the second application time duration includes at least a time duration associated with the UE performing time and frequency synchronization on the TCI state associated with the non-serving cell reference signal.

Aspect 24: The method of any of Aspects 21-23, wherein applying the update associated with the non-serving cell reference signal comprises: scheduling the at least one of the scheduled aperiodic reference signal or the scheduled PDSCH communication to be transmitted to the UE using the TCI state associated with the non-serving cell reference signal after the selected application time duration.

Aspect 25: The method of any of Aspects 16-24, wherein the indication includes an indication to use the non-serving cell reference signal as a path loss reference signal for an uplink channel.

Aspect 26: The method of Aspect 25, wherein a determination of whether the non-serving cell reference signal has been tracked by the UE is based at least in part on a determination of whether the non-serving cell reference signal has been configured as a path loss reference signal for the UE.

Aspect 27: The method of Aspect 26, wherein the second application time duration is longer than the first application time duration, and the second application time duration includes at least a time duration associated with multiple occurrences of the non-serving cell reference signal.

Aspect 28: The method of any of Aspects 25-27, wherein applying the update associated with the non-serving cell reference signal comprises: receiving, from the UE after the selected application time duration, an uplink communication on the uplink channel transmitted using a transmission power determined from a path loss estimation based at least in part on measurements of the non-serving cell reference signal.

Aspect 29: The method of any of Aspects 16-28, further comprising: receiving, from the UE, a UE capability report indicating at least one of a first duration value associated with a tracked non-serving cell reference signal or a second duration value associated with a non-tracked non-serving cell reference signal; and determining at least one of the first application time duration or the second application time duration based at least in part on the at least one of the first duration value or the second duration value.

Aspect 30: The method of Aspect 29, wherein the UE capability report indicates the first duration value, and determining at least one of the first application time duration or the second application time duration comprises: determining the first application time duration based at least in part on the first duration value; deriving the second duration value from the first duration value; and determining the second application time duration based at least in part on the second duration.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: An apparatus for wireless communication at a device, comprising a processor; memory coupled with the processor; and instructions stored in the memory and executable by the processor to cause the apparatus to perform the method of one or more of Aspects 16-30.

Aspect 33: A device for wireless communication, comprising a memory and one or more processors coupled to the memory, the memory and the one or more processors configured to perform the method of one or more of Aspects 1-15.

Aspect 34: A device for wireless communication, comprising a memory and one or more processors coupled to the memory, the memory and the one or more processors configured to perform the method of one or more of Aspects 16-30.

Aspect 35: An apparatus for wireless communication, comprising at least one means for performing the method of one or more of Aspects 1-15.

Aspect 36: An apparatus for wireless communication, comprising at least one means for performing the method of one or more of Aspects 16-30.

Aspect 37: A non-transitory computer-readable medium storing code for wireless communication, the code comprising instructions executable by a processor to perform the method of one or more of Aspects 1-15.

Aspect 38: A non-transitory computer-readable medium storing code for wireless communication, the code comprising instructions executable by a processor to perform the method of one or more of Aspects 16-30.

Aspect 39: A non-transitory computer-readable medium storing a set of instructions for wireless communication, the set of instructions comprising one or more instructions that, when executed by one or more processors of a device, cause the device to perform the method of one or more of Aspects 1-15.

Aspect 39: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories;
one or more processors, coupled to the one or more memories, configured to:
receive an indication of an update associated with a non-serving cell reference signal of a non-serving cell, wherein the indication includes a beam indication to use a transmission configuration indicator (TCI) state associated with the non-serving cell reference signal for receiving at least one of a scheduled aperiodic reference signal or a scheduled physical downlink shared channel (PDSCH) communication;

apply the update associated with the non-serving cell reference signal after an application time duration selected from a first application time duration and a second application time duration, wherein the first application time duration is selected based at least in part on the non-serving cell reference signal being tracked by the UE based at least in part on the UE measuring the non-serving cell reference signal, and wherein the second application time duration is selected based at least in part on the non-serving cell reference signal not being tracked by the UE; and receive, after the application time duration, the at least one of the scheduled aperiodic reference signal or the scheduled PDSCH communication using the TCI state associated with the non-serving cell reference signal.

2. The UE of claim 1, wherein the application time duration is based at least in part on a time at which the UE receives the indication.

3. The UE of claim 1, wherein the one or more processors are further configured to:

transmit an acknowledgment based at least in part on receiving the indication, wherein the application time duration is based at least in part on a time at which the UE transmits the acknowledgment.

4. The UE of claim 1, wherein whether the non-serving cell reference signal has been tracked by the UE is based at least in part on whether the UE has been configured to monitor the non-serving cell reference signal for inter-cell mobility measurements.

5. The UE of claim 1, wherein whether the non-serving cell reference signal has been tracked by the UE is based at least in part on a reference signal being configured for measurement by the UE on the TCI state associated with the non-serving cell reference signal.

6. The UE of claim 1, wherein the second application time duration is longer than the first application time duration.

7. The UE of claim 6, wherein the second application time duration includes at least a time duration associated with a frequency.

8. A network entity for wireless communication, comprising:

one or more memories;
one or more processors, coupled to the one or more memories, configured to:

transmit an indication of an update associated with a non-serving cell reference signal of a non-serving cell, wherein the indication includes a beam indication to use a transmission configuration indicator (TCI) state associated with the non-serving cell reference signal for receiving at least one of a scheduled aperiodic reference signal or a scheduled physical downlink shared channel (PDSCH) communication; and transmit, after an application time duration, the at least one of the scheduled aperiodic reference signal or the scheduled PDSCH communication using the TCI state associated with the non-serving cell reference signal, wherein the update associated with the non-serving cell reference signal is applied after the application time duration, wherein the application time duration is selected from a first application time duration and a second application time duration, wherein the first application time duration is selected based at least in part on the non-serving cell reference signal being tracked by a user equipment (UE) based at least in part on the UE measuring the non-serving cell reference signal, and wherein the second application time duration is selected based at least in part on the non-serving cell reference signal not being tracked by the UE.

9. The network entity of claim 8, wherein the application time duration is based at least in part on a time at which the indication is transmitted.

10. The network entity of claim 8, wherein the one or more processors are further configured to:

receive an acknowledgment based at least in part on transmitting the indication, wherein the application time duration is based at least in part on a time associated with receiving the acknowledgment.

11. The network entity of claim 8, wherein whether the non-serving cell reference signal has been tracked by the UE is based at least in part on whether the UE has been configured to monitor the non-serving cell reference signal for inter-cell mobility measurements.

12. The network entity of claim 8, wherein whether the non-serving cell reference signal has been tracked by the UE is based at least in part on a reference signal being configured for measurement by the UE on the TCI state associated with the non-serving cell reference signal.

13. The network entity of claim 8, wherein the second application time duration is longer than the first application time duration.

14. The network entity of claim 13, wherein the second application time duration includes at least a time duration associated with a frequency.

15. A method of wireless communication performed by a user equipment (UE), comprising:

receiving an indication of an update associated with a non-serving cell reference signal of a non-serving cell, wherein the indication includes a beam indication to use a transmission configuration indicator (TCI) state associated with the non-serving cell reference signal for receiving at least one of a scheduled aperiodic reference signal or a scheduled physical downlink shared channel (PDSCH) communication;

applying the update associated with the non-serving cell reference signal after an application time duration selected from a first application time duration and a second application time duration, wherein the first application time duration is selected based at least in part on the non-serving cell reference signal being tracked by the UE based at least in part on the UE measuring the non-serving cell reference signal, and wherein the second application time duration is selected based at least in part on the non-serving cell reference signal not being tracked by the UE; and receiving, after the application time duration, the at least one of the scheduled aperiodic reference signal or the scheduled PDSCH communication using the TCI state associated with the non-serving cell reference signal.

16. The method of claim 15, wherein the application time duration is based at least in part on a time at which the UE receives the indication.

17. The method of claim 15, further comprising:
transmitting an acknowledgment based at least in part on receiving the indication, wherein the application time duration is based at least in part on a time at which the UE transmits the acknowledgment.

18. The method of claim 15, wherein whether the non-serving cell reference signal has been tracked by the UE is based at least in part on a reference signal being configured for measurement by the UE on the TCI state associated with the non-serving cell reference signal.

19. The method of claim 15, wherein the second application time duration is longer than the first application time duration.

20. The method of claim 19, wherein the second application time duration includes at least a time duration associated with a frequency.

* * * * *